Nov. 7, 1933.　　　　W. C. ASBURY　　　　1,934,028
PROCESS FOR THE TREATMENT OF CARBONACEOUS MATERIALS
Filed July 23, 1928
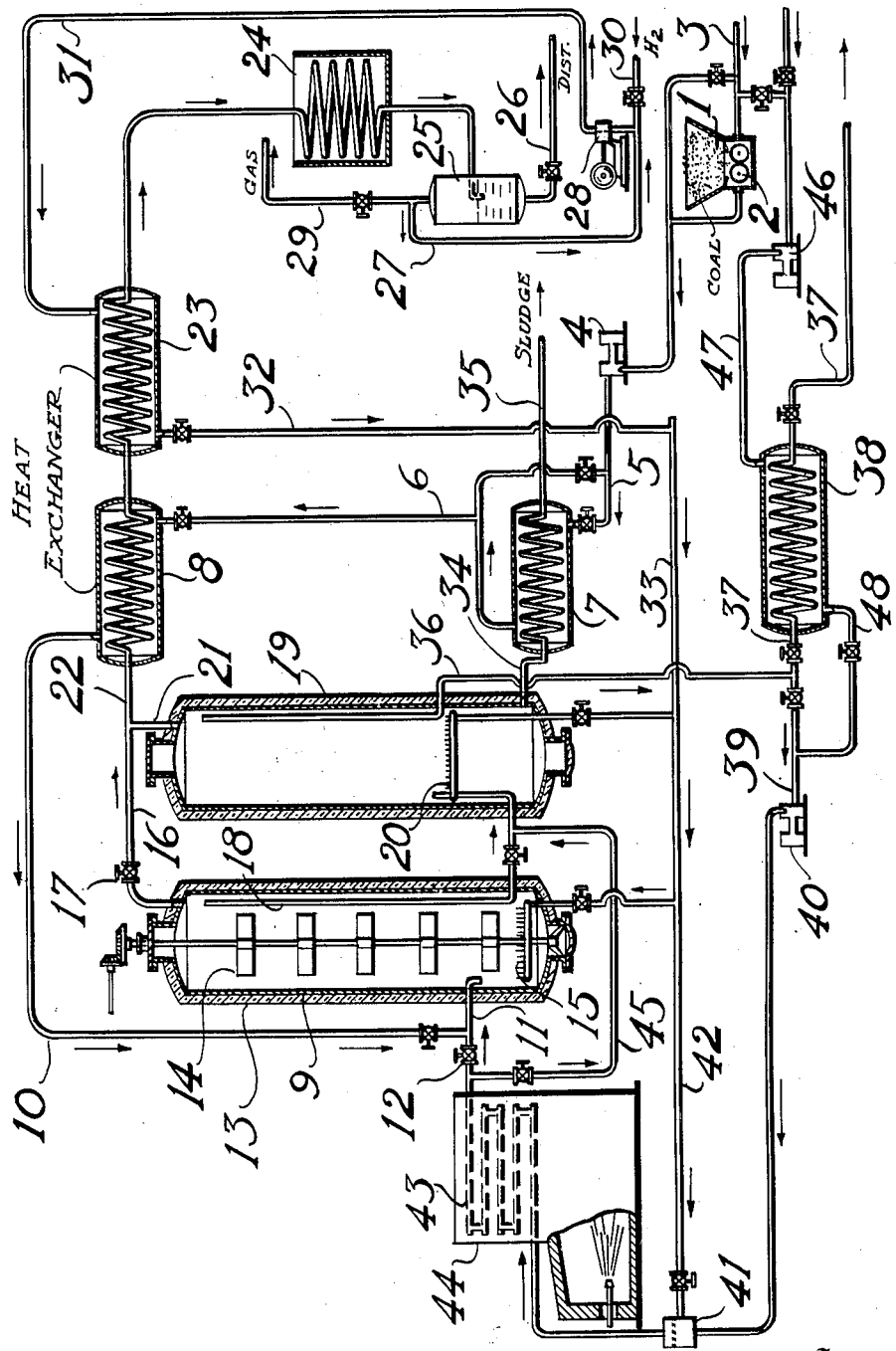
WILLARD C. ASBURY　Inventor
By his Attorney Patented Nov. 7, 1933

1,934,028

UNITED STATES PATENT OFFICE 1,934,028

PROCESS FOR THE TREATMENT OF CARBONACEOUS MATERIALS

Willard C. Asbury, Baton Rouge, La., assignor to Standard-I. G. Company

Application July 23, 1928. Serial No. 294,620

8 Claims. (Cl. 196—53)

The present invention relates to the art of obtaining valuable liquid products from solid carbonaceous materials and more specifically comprises an improved process for converting solid or semi-solid carbonaceous materials, especially such as may contain considerable quantities of ash into hydrocarbon oils. My invention will be fully understood from the following description and the drawing.

The drawing is a semi-diagrammatic view in sectional elevation of an apparatus for accomplishing my process and indicates the flow of materials.

Referring to the drawing, reference numeral 1 denotes a hopper into which solid carbonaceous material such as coal, lignite, bitumen and the like is placed. This material is disintegrated by rolls 2 or by any suitable form of mill adapted to the properties of the particular substance and oil is admitted to the material by a pipe 3. The mass of oil and solid matter is forced by pump 4 through lines 5 and 6 and through heat exchangers 7 and 8 into a retort or drum 9 by means of line 10 and the inlet 11 which is fitted with a check valve 12. Line 11 discharges into the lower part of drum 9 which is of any preferred design but is capable of withstanding internal pressures of 50 to 200 atmospheres or higher when at temperatures in the neighborhood of 1000° F. The retort is protected against avoidable loss of heat by insulation 13 and the contents of the drum is kept in thorough agitation by a stirring means 14 or its equivalent. Hydrogen or a gas rich in hydrogen is forced into the base of the drum by spray pipe 15 and vapor may be conducted from the upper end of the drum by vapor line 16 which is fitted with a valve 17.

The liquid level is preferably well up in drum 9 and a pipe 18 is provided to withdraw the mixture and conduct it into a second drum 19 which is constructed in general similarly to drum 9. The stream preferably discharges into the mid-section of drum 19 and hydrogen is forced into the drum by a spray pipe 20 which is preferably placed in the middle of the drum so as to leave a quiescent zone at the bottom of the drum while the upper part is in agitation. Vapor is withdrawn by line 21 and conducted preferably in admixture with that from drum 9 by line 22 to exchangers 8 and 23 to condenser 24 and separator 25. Distillate is withdrawn from the separator 25 by line 26 to storage (not shown). The gas, which contains unconsumed hydrogen, is conducted by line 27 to a compressor 28. Gas may be bled from the system by line 29 and fresh hydrogen added by pipe 30 and the gas from the compressor may be purified to remove such gases as hydrogen sulfid and to prevent the hydrocarbon gas from accumulating. The compressed gas flows by line 31 through exchanger 23 and through line 32 to manifold 33 from which spray pipes 15 and 20 are fed.

From the lower part of drum 19 into which solid materials such as ash and the like are allowed to settle, a stream of sludge is withdrawn by line 34, through exchanger 7 and to storage by line 35. A pipe 36 is provided to conduct liquid from the upper part of drum 19 and conduct it either to storage (not shown) by line 37 and cooler 38 or by line 39 and pump 40 to mixer 41 into which gas, such as hydrogen, may be fed by line 42 from manifold 33. The mixer, which is shown generally, may be in the form of a Venturi mixing throat or may provide a plate drilled with small holes through which the gas passes into the oil. The mixture then passes through a fired coil 43, arranged in a setting 44 or heated in any suitable manner and discharges through check valve 12 into line 11 and so to drum 9. A portion of the oil may be conducted from the coil 43 to drum 19 by branch line 45. Fresh oil from line 3 or from any other source may be forced by pump 46 through lines 47 and 48 and exchanger 38 to line 39.

In the operation of my process, a fluent mixture of oil and a solid or semi-solid carbonaceous material is preheated and passed into the first of a series of drums of which only two have been shown, although one or more than two might be used. The temperature maintained is preferably between the approximate limits of 550 and 970° F., while pressure above 50 atmospheres and preferably between 100 and 200 atmospheres is maintained. At relatively high temperatures the carbonaceous material and the oil are hydrogenated and decomposed to form a large share of low boiling hydrocarbon oils, which are obtained as distillate from separator drum 25, but if lower temperatures are used, there will be less decomposition and heavier oils will be obtained which may be withdrawn by line 37. A part of the heavier oils may be heated by passage through coil 43 and is used to maintain the drums at the desired temperatures, but if heavy oil be withdrawn from the system by line 37, fresh oil may be introduced directly into line 39 by pump 46, as indicated above. The lower section of one drum is preferably used as a settling chamber, and ash or other solid materials are withdrawn by line 34 so that mineral matter does not accumulate in the drums. I have shown the settling zone in a part of one of the reaction drums but obviously a separate settling drum could be provided from which line 34 would conduct the sludge from the lower end and clean oil, substantially free of solids, would be withdrawn by line 36 from the upper part.

If high temperatures are held in drums 9 and 19, it is desirable to withdraw vapors from both drums but it is not necessary to take vapors from drum 9 and the mixture of oil, gas and mineral matter may be conducted to drum 19 for further reaction and separation. The quantity of hydrogen circulated through the mass is in considerable excess of that required to react with the solid carbonaceous matter and it is preferable to admit the gas into the mixer 41 as well as into the drums, but if desired, it may be omitted from the mixer.

In operating my process under the conditions disclosed, the quantity of low boiling distillate produced is controlled by the temperature maintained in coil 43 and drums 9 and 19. If temperatures from 750 to 970° F. are used, there is considerable conversion to low boiling distillates and it is desirable to return all of the heavy oil from line 36 through the coil 43 to the drums. At temperatures below about 750° F., there is little conversion to low boiling oils and oils suitable for lubricants, and other commercial purposes can be obtained by drawing off part of the oil from line 36 by line 37. Fresh oil free of solid materials may be added by line 47 to make up for the oil withdrawn by line 37.

Powdered coal, lignite, bitumens and the like are suitable for my process and the oil used may be crude oil or reduced crude, gas oil and the like, although cracked residues and heavy asphaltic oils are preferable for the process.

My invention is not to be limited by any theory of the reaction nor by any example given merely by way of illustration, but only by the following claims in which I wish to claim all novelty inherent in my process.

I claim:

1. Process for the destructive hydrogenation of readily carbonizable materials which comprises forcing said material while preheated to a point below its carbonizing temperature into a zone of destructive hydrogenation maintained under hydrogen pressure of at least 50 atmospheres, separately heating a hydrocarbon oil to a temperature above the reaction temperature and forcing such oil into the reaction zone, the oil temperature being sufficient to maintain the reaction zone at a destructive hydrogenation temperature above 750° F. and removing products of reaction.

2. Process according to claim 1 in which the hydrocarbon oil is heated in presence of hydrogen and the mixture of hydrogen and oil is discharged into the reaction zone.

3. Process for converting solid carbonaceous material into low boiling hydrocarbon oils which comprises passing a suspension of said material in oil at below reaction temperature into a reaction zone, subjecting the material therein to the action of hydrogen at a pressure in excess of 50 atmospheres but at a destructive hydrogenation temperature above 750° F., discharging a portion of the suspension from the reaction zone into a settling zone wherein suspended solid material settles, withdrawing supernatant oil from an elevated part of the said settling zone, passing the withdrawn oil through a heating zone and discharging it into the mass of suspension in the reaction zone.

4. Process according to claim 3 in which the supernatant oil withdrawn from the settling zone is passed through the heating zone in admixture with hydrogen.

5. Process according to claim 3 in which the hot oil is discharged into both the reaction zone and the settling zone.

6. Process according to claim 3 in which the suspension withdrawn from the reaction zone is discharged into the settling zone at a point substantially above the bottom thereof.

7. Process according to claim 3 in which hydrogen is added directly to the settling zone at a point substantially above the bottom thereof.

8. Process for converting solid carbonaceous material to liquid hydrocarbon oils which comprises forcing a suspension of said material in heavy hydrocarbon oil at a temperature substantially below reaction temperature into a reaction zone maintained under pressure in excess of 50 atmospheres with hydrogen and at a temperature between about 750° F. and 970° F. wherein it is constantly agitated, removing vapors formed during the reaction, withdrawing suspension and passing it into a quiescent settling zone, removing sludge that settles out, withdrawing supernatant liquid from an elevated part of said settling zone, passing this liquid through a heating zone and discharging the hot liquid into the reaction zone, whereby the mass of agitated suspension therein is maintained at reaction temperature.

WILLARD C. ASBURY.